US012130590B2

(12) United States Patent
Forsey et al.

(10) Patent No.: US 12,130,590 B2
(45) Date of Patent: Oct. 29, 2024

(54) TIMEPIECE MOVEMENT

(71) Applicant: GREUBEL FORSEY S.A., La Chaux-de-Fonds (CH)

(72) Inventors: Stephen Forsey, Les Brenets (CH); Florian Corneille, Mathay (FR)

(73) Assignee: GREUBEL FORSEY S.A., La Chaux-de-Fonds (CH)

( * ) Notice: Subject to any disclaimer, the term of this patent is extended or adjusted under 35 U.S.C. 154(b) by 40 days.

(21) Appl. No.: 17/763,816

(22) PCT Filed: Sep. 29, 2020

(86) PCT No.: PCT/EP2020/077244

§ 371 (c)(1),
(2) Date: Mar. 25, 2022

(87) PCT Pub. No.: WO2021/063953

PCT Pub. Date: Apr. 8, 2021

(65) Prior Publication Data

US 2022/0326659 A1 Oct. 13, 2022

(30) Foreign Application Priority Data

Sep. 30, 2019 (CH) .................................... 01238/19
Sep. 30, 2019 (EP) .................................... 19200461

(51) Int. Cl.

| | |
|---|---|
| ***G04B 29/02*** | (2006.01) |
| ***G04B 5/18*** | (2006.01) |
| ***G04B 33/08*** | (2006.01) |
| ***G04B 45/02*** | (2006.01) |

(52) U.S. Cl.
CPC ............. *G04B 29/022* (2013.01); *G04B 5/18* (2013.01); *G04B 33/08* (2013.01); *G04B 45/02* (2013.01)

(58) Field of Classification Search
CPC ........ G04B 29/022; G04B 5/18; G04B 33/08; G04B 45/02
See application file for complete search history.

(56) References Cited

U.S. PATENT DOCUMENTS 6,402,368 B1 6/2002 Grimm et al.
9,004,746 B2 * 4/2015 Beccia .............. G04B 31/0123 368/127

(Continued)

FOREIGN PATENT DOCUMENTS

FR 1181584 6/1959
FR 3226081 10/2017

*Primary Examiner* — Renee S Luebke
*Assistant Examiner* — Sean R Brannon
(74) *Attorney, Agent, or Firm* — DUANE MORRIS LLP; Gregory M. Lefkowitz; Joaquin Hernandez

(57) ABSTRACT

Timepiece movement (1) comprising:—a main frame (3) acting as a support for a drive source (5) and for at least one base gear train (7) designed to be driven by the drive source (5);—at least one flying bridge (11) cantilever-mounted on an element of the main frame (3) and extending in superposition on the latter, characterized in that the flying bridge (11) supports at least one functional element (13; 9) kinematically linked to the base gear train (7) via a flying gear train (17, 17*a*, 17*b*, 17*c*, 17*d*), and in that the functional element (13; 9) and at least some elements of the flying gear train (17*a*, 17*b*, 17*c*, 17*d*) are entirely supported on the flying bridge (11).

8 Claims, 2 Drawing Sheets

(56) References Cited

U.S. PATENT DOCUMENTS

| | | | | |
|---|---|---|---|---|
| 2006/0239124 | A1 * | 10/2006 | Thumm | G04B 45/02<br>368/88 |
| 2010/0097899 | A1 * | 4/2010 | Greubel | G04B 19/082<br>368/207 |
| 2012/0092967 | A1 | 4/2012 | Courvoisier et al. | |

* cited by examiner

TIMEPIECE MOVEMENT

CROSS-REFERENCE TO RELATED APPLICATIONS

This application is a § 371 national stage entry of International Application No. PCT/EP2020/077244, filed Sep. 29, 2020, which claims priority to European Patent Application No. 19200461.2, filed Sep. 30, 2019, and Swiss Patent Application No. 01238/19, filed Sep. 30, 2019, the entire contents of which are incorporated herein by reference.

TECHNICAL FIELD

The present invention relates to the field of watchmaking. It relates, more particularly, to a timepiece movement having a particular frame construction.

PRIOR ART

In so-called "complicated" timepieces, i.e. pieces comprising several additional mechanisms, one of the problems often encountered is a lack of volume in the movement for arranging the various mechanisms and/or on the dial to lay out the displays, animations, and other visual elements. The solution most commonly used, concerning the crowding of the movement, is that of increasing its thickness, by providing mechanisms on (sets of) additional levels. The movement is thus made very thick, which requires a cumbersome watch case. MB&F's "Legacy Machine" series overcomes this problem to some extent. In this construction, the balance-hairspring assembly is mounted between, on one hand, a first bearing arranged conventionally in the frame and, on the other hand, a second bearing borne by a pair of cantilevered arms surmounting the mechanism and defining a flying bridge. However, the escapement system is still arranged on the frame in a relatively conventional manner, requiring a passage for the axis of the balance wheel. The fact that one of the bearings for the axis of the balance is arranged conventionally on the frame implies traditional construction constraints concerning the pivoting on the frame as well as on the arrangement of the escapement.

When it comes to arranging displays, animations and the like, a common solution is to arrange some of these visual elements on the back side of the piece, visible through a transparent caseback. However, these elements are not visible when the watch is worn by a user, it being necessary to remove and turn over the watch to be able to view these displays.

The object of the invention is therefore to propose a timepiece movement in which one or other of the aforementioned drawbacks is at least partially overcome.

DISCLOSURE OF INVENTION

More specifically, the invention relates to a timepiece movement as defined by claim 1. This movement comprises:

- a main frame, typically comprising a plate and at least one bridge, serving as a support for a power source as well as for at least one base gear train arranged to be driven by said power source;
- at least one flying bridge mounted in cantilever fashion on an element of said main frame and extending in superposition of the latter.

According to the invention, said flying bridge carries at least one functional element such as a display member, a regulating system (such as a balance-hairspring-escapement system), an oscillating winding mass or the like, kinematically connected to said base gear train via a flying gear train. Furthermore, said functional element as well as at least certain elements of said flying gear train are entirely supported by said flying bridge. In other words, the members in question are pivoted exclusively on the flying bridge, without the use of any bearing positioned on the main frame.

By these means, the functional element, whether it be a display member, a regulating system (or an element thereof) or other element, can be positioned in superposition of the main frame, without the need for any bearing borne thereby. This creates space in the movement without the need to stack even more levels on the main frame, and this not only on the flying bridge but also on the main frame, which affords the constructor greater freedom. Indeed, when the movement is cased-up, the flying bridge extends in the gap between the main frame and the glass (or alternatively the caseback, which can also be transparent) and thus uses space which typically goes unused.

Advantageously, the whole of said flying gear train is entirely supported by said flying bridge.

In one particular embodiment, the movement may include at least two flying bridges, each carrying a respective flying gear train. These flying gear trains can be independent of each other or can mesh with each other at a respective toothed wheel of each flying gear train in order to transmit torque from one side of the main frame to the other. In particular, this meshing can take place at the level of the last wheel of each flying gear train.

The invention also relates to a timepiece comprising a case that is closed at least on one side by a glass and, mounted in said case, a movement as described hereinabove, said functional element and said flying bridge being located between said main frame and said glass.

BRIEF DESCRIPTION OF THE DRAWINGS

Other details of the invention will appear more clearly upon reading the following description, made with reference to the appended drawings in which.

EMBODIMENTS OF THE INVENTION

Figure 1:
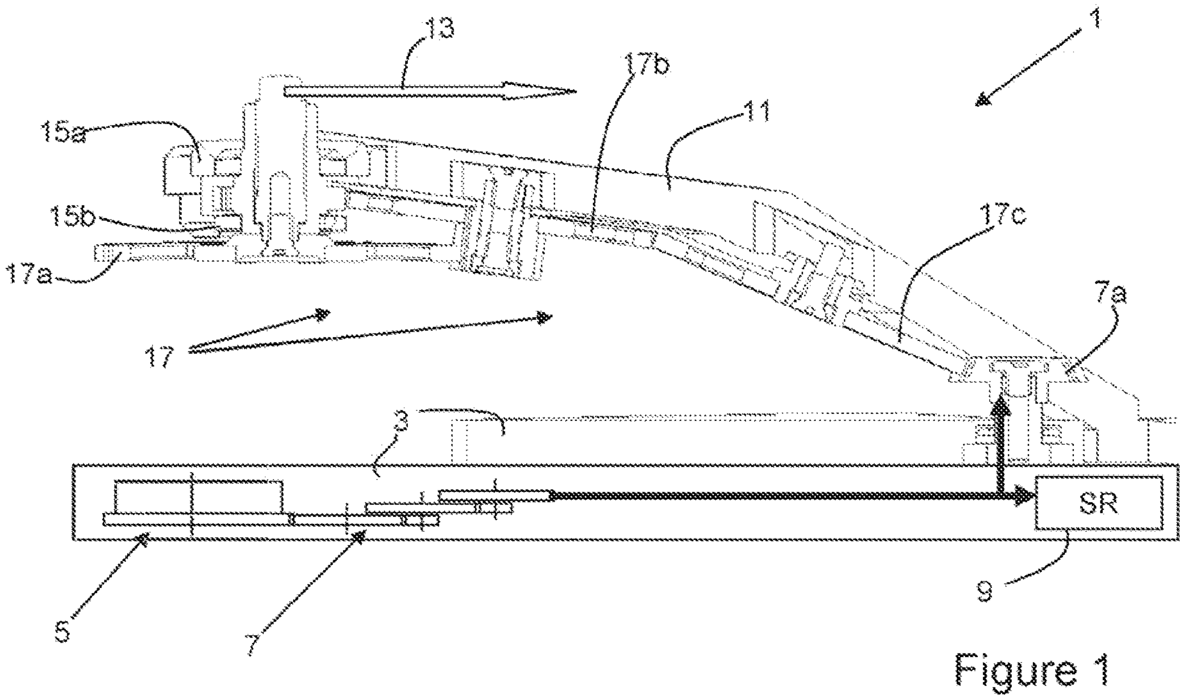
FIG. 1 is a schematic sectional view of part of a timepiece movement according to the invention.

FIG. 1 schematically illustrates part of a timepiece movement 1 according to the invention. This movement comprises a main frame 3, comprising a plate and at least one bridge as generally known and which therefore do not need to be described in detail.

The main frame 3 carries a power source 5, illustrated here as a conventional barrel, housing a mainspring. Other kinds of power sources 5 such as an electric motor can also find an application in the movement 1 according to the invention. The power source 5 can be pivotally mounted between two frame elements or can be mounted in a flying manner, supported solely on one of its sides, as generally known.

The power source 5 drives a main gear train 7, partially illustrated (the rest of the main gear train 7 being illustrated schematically by means of thick arrows), which is supported by the frame and which comprises a plurality of toothed wheels, one or more belts, chains or the like, or a combination of such elements, as generally known. In addition, the type of toothing of the toothed wheels can be of straight-cut type, but also of helical, bevel or contrate type, or similar, depending on the needs of the construction and the shape of the bridge.

In this case, the gear train 7 also drives a regulating system 9 mounted on the main frame 3, for example of the balance-hairspring-escapement type of any kind, a mono-, bi- or tri-axial tourbillon, a carrousel, or any other known regulating system used to determine the rate of the movement. In addition, each of the regulating systems can be inclined or non-inclined with respect to the plane of the main frame 3.

The timepiece movement also includes a flying bridge 11, mounted in cantilever fashion on the main frame 3, in particular on a bridge or on the plate of the latter. In other words, the flying bridge has one extremity fixed to the main frame 3, and one free extremity. The flying bridge 11 extends in superposition of the main frame 3 and carries at least one functional element 13, which is, in this case, a hand arranged to display horological information such as seconds, minutes, hours, the day, date, week number, moon phase or any other horological information. Instead of a hand, a disc or any other type of display member can be provided. Similarly, the display mechanism may for example be retrograde, jumping, or any type of mechanism known to those skilled in the art.

This functional element 13 is entirely supported by the flying bridge 11, by means of a pair of bearings 15*a*, 15*b* arranged on either side of the flying bridge 11, or by any other ad hoc arrangement serving to support it. It is obvious that any type of bearing can be envisaged, such as for example ball bearings or any other type of bearing known to those skilled in the art.

The functional element 13 is fixed in rotation to an element 17*a* of a flying gear set 17, which is made up of three toothed wheels 17*a*, 17*b*, 17*c*, which are each entirely supported by the flying bridge 11 and which form a gear train driven by a drive wheel 7*a* mounted on the main frame 3 and driven by the power source 5. In the illustrated embodiment, wheels 17*a* and 17*c* each comprise a single toothed gear, while wheel 17*b* consists of a gear and a pinion, but other combinations of toothed elements are also possible. "Fully supported" means that wheels 17*a*, 17*b*, 17*c* pivot exclusively on the flying bridge, without any use of a bearing located on the main frame 3.

As illustrated, all of the toothed wheels 17*a*, 17*b*, 17*c* are mounted on the lower side of the flying bridge 11, facing the main frame 3, but it is also possible to mount them all on the other side of the bridge 11, facing the user. Furthermore, a combination of toothed elements on both sides of the flying bridge 11 is also possible, in which case at least some of the wheels can comprise a toothed element on each side of the bridge, these being linked together by a shaft, a tube or similar.

Furthermore, it is also possible to provide several functional elements 13 each fixed in rotation with a different wheel 17*a*, 17*b*, 17*c* of the flying gear train 17. By adapting the gear ratios appropriately, the flying gear train can for example serve as a dial train, by displaying the hour by means of a functional element 13 that is fixed in rotation with the wheel 17*a*, and the minutes by a functional element that is fixed in rotation with or driven by the wheel 17*b* or 17*c*. Thus, depending on the inclination of the wheels 17*a*, 17*b*, 17*c* of the flying gear train, it is possible to have an additional functional element that is fixed to several (or indeed all) of the latter with an inclination that differs from one to another, parallel to the axis of its respective wheel. This can provide the timepiece with a unique appearance.

Figure 2:
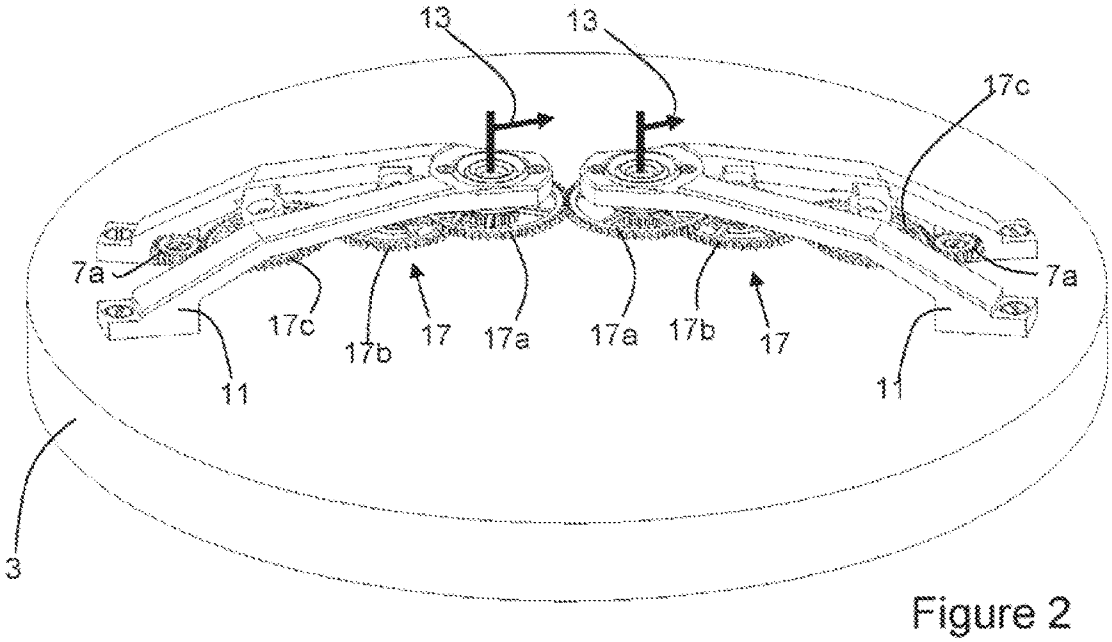
FIG. 2 is an isometric view of part of another variant of a timepiece movement according to the invention, comprising two flying bridges carrying flying gear trains which mesh with each other.

As shown in FIG. 2, in which the elements carried by the main frame 3 have not been shown, it is also possible to provide a plurality of flying bridges 11 and flying gear trains 17, which can mesh with each other at their last wheels 17*a*. Alternatively, it is possible for the two flying gear trains 17 to not cooperate directly with each other. Such an arrangement will allow the watchmaker to provide, for example, a space in the center of the movement 1, the majority of the elements of the movement forming part of the flying gear trains 17. This space can be transparent, or can contain any object (sculpture, animation, game device or the like).

In the variant illustrated, each wheel 17*a* carries a functional element 13 such as a hand, but it is also possible to provide only one functional element carried by one or other of the flying gear trains 17. In this construction, the hands rotate in opposite directions, with an angular speed ratio which depends on the gear ratio between the two wheels 17*a*. It is also possible to interpose an intermediate wheel between the two wheels 17*a*, or to mount one of the hands fixed in rotation with the wheel 17*b* on one or the other of the flying gear trains 17. Alternatively, the two flying gear trains 17 can be used to transmit torque from one side of the main frame to the other, without requiring a bulky gear train or crown wheel passing through the latter.

Figure 3:
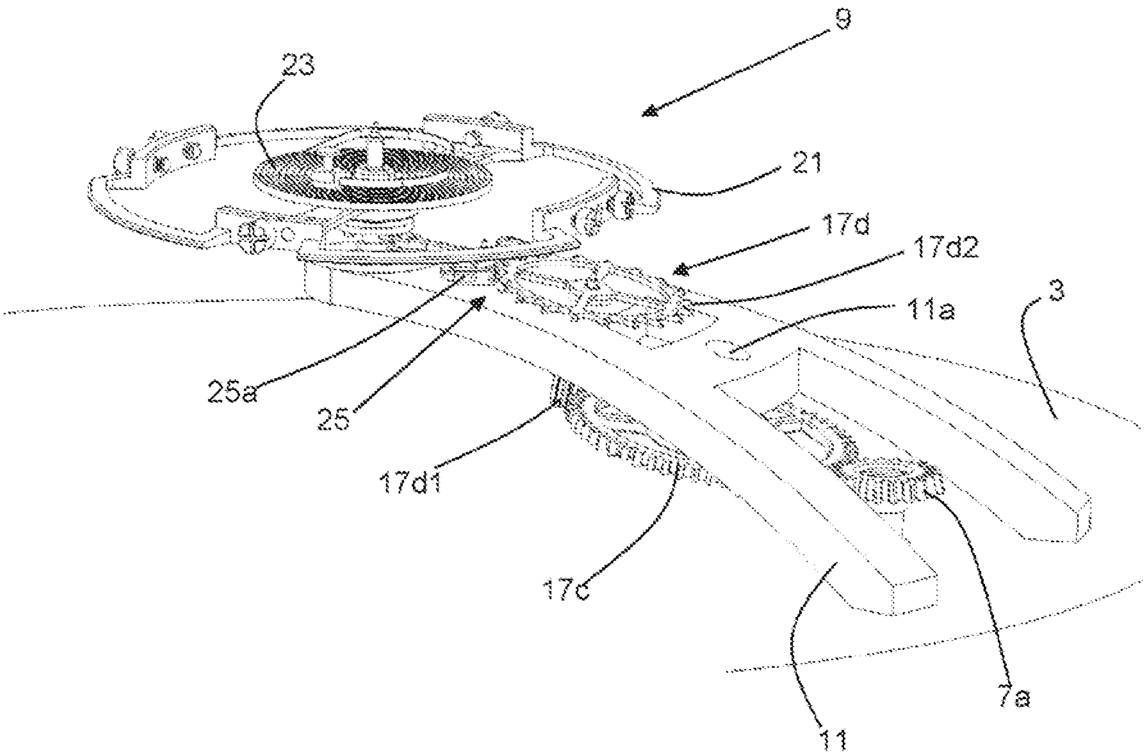
FIG. 3 is a schematic view of part of another variant of a timepiece movement according to the invention, in which the flying bridge carries the regulating system.

FIG. 3, in which the elements carried by the main frame 3 have also not been shown, illustrates yet another embodiment, in which the regulating system 9 is carried by the flying bridge 11 instead of being located on the main frame 3. In the variant shown, the regulating system 9 comprises a balance 21-hairspring 23 assembly that is kept in oscillation by an escapement system 25 of conventional type, the regulating system 9 being considered as the functional element within the meaning of the invention. Alternatively, a regulating system of any other type (detent escapement, tourbillon, carrousel and the like) may be used.

The balance 21 can be mounted so as to be supported on only one of its sides ("flying balance"), for example by being supported on the flying bridge 11 via a ball bearing. Alternatively, the flying bridge 11 may also include a plate (not shown) carrying a conventional bearing, this plate being fixed to the flying bridge 11 by means of a screw or the like, cooperating with the opening 11*a* for example.

In the construction illustrated, the wheel 17*d* is an escapement wheel comprising a pinion 17*d*1 located on the lower side of the flying bridge 11 as well as an escapement gear 17*d*2 located on the upper side of the flying bridge 11. The latter cooperates with an anchor 25*a* in a known manner, and clearly illustrates the principle that a wheel can include toothed elements located on either side of the bridge 11.

By these means, the balance 21—hairspring 23—escapement 25 assembly located on the flying bridge regulates the rate of the base gear train 7 driven by the power source 5, these last two elements not being shown in FIG. 3.

Other alternatives, based on the principles described above, are also possible. For example, the functional element carried by the flying bridge 11 can be any type of animation, a device for displaying any type of horological information related to time or to the movement (such as the power reserve), an oscillating weight arranged to wind the barrel 5, or similar.

In view of the above, it is clear that when movement 1 is cased-up, the flying bridge 11 as well as the functional element 13, 21 will be interposed between the main frame 3 and a glass, whether on the middle side or on the back side.

It should also be noted that other standard elements such as a dial, a watch case, winding and/or time-setting means and the like have not been represented.

Although the invention has been previously described in connection with specific embodiments, other additional variants are also possible without departing from the scope of the invention as defined by the claims.

The invention claimed is:

1. A timepiece movement comprising:

a main frame serving as a support for a power source as well as for at least one base gear train arranged to be driven by said power source;

at least one flying bridge mounted in cantilever fashion on a single end of an element of said main frame and extending in superposition of the latter, wherein said flying bridge has a side which faces said main frame and carries at least one functional element kinematically connected to said base gear train via a flying gear train comprising a plurality of toothed wheels, and wherein the at least one functional element as well as said plurality of toothed wheels of said flying gear train are fully supported by said flying bridge, said toothed wheels being mounted on said side of said flying bridge which faces said main frame.

2. The movement as claimed in claim 1, in which said functional element is a display member.

3. The movement as claimed in claim 1, in which said functional element is a regulating system.

4. The movement as claimed in claim 1, comprising at least two flying bridges each carrying a respective flying gear train.

5. The movement as claimed in claim 4, in which said flying gear trains mesh with each other.

6. The movement as claimed in claim 5, in which said flying gear trains mesh with each other at the level of the last wheel of each flying gear train.

7. A timepiece comprising a case that is closed at least on one side by a glass and, mounted in said case, a movement as claimed in claim 1, said functional element and said at least one flying bridge being located between said main frame and said glass.

8. A timepiece movement comprising:

a main frame serving as a support for a power source as well as for at least one base gear train arranged to be driven by said power source;

at least one flying bridge mounted in cantilever fashion on a single end of an element of said main frame and extending in superposition of the latter, wherein said flying bridge carries at least one functional element kinematically connected to said base gear train via a flying gear train comprising a plurality of toothed wheels, wherein the at least one functional element as well as at least some of said plurality of toothed wheels of said flying gear train are fully supported by said flying bridge, and wherein the at least one functional element is a regulating system.

* * * * *